United States Patent
Yamashita et al.

(10) Patent No.: US 7,277,253 B2
(45) Date of Patent: Oct. 2, 2007

(54) STORAGE DEVICE

(75) Inventors: Satoshi Yamashita, Kawasaki (JP);
Takeshi Hara, Kawasaki (JP);
Yoshifumi Obara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 69 days.

(21) Appl. No.: 11/358,455

(22) Filed: Feb. 21, 2006

(65) Prior Publication Data

US 2007/0064331 A1    Mar. 22, 2007

(30) Foreign Application Priority Data

Sep. 22, 2005  (JP)  .............................. 2005-275391

(51) Int. Cl.
*G11B 21/02*  (2006.01)
(52) U.S. Cl. ........................................... 360/75
(58) Field of Classification Search .............. 360/75, 360/69, 235.5, 256.4, 256.2, 256.5, 235.7, 360/55
See application file for complete search history.

(56) References Cited

U.S. PATENT DOCUMENTS

| | | | | |
|---|---|---|---|---|
| 5,742,455 A | * | 4/1998 | Boutaghou | 360/256.5 |
| 5,798,884 A | * | 8/1998 | Gillis et al. | 360/75 |
| 5,805,384 A | * | 9/1998 | Bronshvatch et al. | 360/256 |
| 5,875,075 A | * | 2/1999 | Hickox | 360/256.4 |
| 5,877,922 A | * | 3/1999 | Boutaghou | 360/256.5 |
| 6,088,193 A | * | 7/2000 | Misso et al. | 360/256.2 |
| 6,212,027 B1 | | 4/2001 | Lee et al. | |
| 6,496,319 B1 | | 12/2002 | Kusumoto et al. | |
| 6,501,624 B1 | * | 12/2002 | Gillis et al. | 360/256.3 |
| 6,754,027 B2 | | 6/2004 | Hirano et al. | |
| 6,760,178 B2 | * | 7/2004 | Shibata | 360/75 |
| 6,861,854 B1 | * | 3/2005 | Guo et al. | 324/727 |
| 6,985,333 B1 | * | 1/2006 | Hiller et al. | 360/235.5 |
| 7,035,053 B1 | * | 4/2006 | Oveyssi et al. | 360/256.4 |
| 7,042,674 B1 | * | 5/2006 | Baril et al. | 360/75 |
| 7,159,299 B1 | * | 1/2007 | McMunigal et al. | 29/603.03 |
| 7,184,244 B1 | * | 2/2007 | Haddock et al. | 360/235.7 |
| 2002/0141100 A1 | * | 10/2002 | Garrigues et al. | 360/75 |
| 2003/0076121 A1 | * | 4/2003 | Guo et al. | 324/727 |
| 2005/0013054 A1 | * | 1/2005 | Miyamoto et al. | 360/256.4 |

* cited by examiner

*Primary Examiner*—Fred F. Tzeng
(74) *Attorney, Agent, or Firm*—Greer, Burns & Crain, Ltd.

(57) ABSTRACT

A storage device configured to load and unload a head against a storage medium, includes a latch mechanism configured to latch the unloaded head, a head moving mechanism configured to move the head, a measuring part configured to measure an unlatch force necessary for unlatching the head latched by the latch mechanism, by applying a constant electrical current to the head mechanism so that the head is moved in a load direction, by measuring a back electromotive voltage, and calculating a moving speed and acceleration of the head, a storing part configured to store information indicating the measured unlatch force in the storage device, and a control part configured to apply a driving electrical current corresponding to the stored information to the head moving mechanism where the head is latched by the latch mechanism at the time of loading.

9 Claims, 15 Drawing Sheets

STORAGE DEVICE

BACKGROUND OF THE INVENTION

1. Field of the Invention

The present invention generally relates to storage devices, and more specifically, to a storage device having a latch mechanism configured to latch an unloaded head in a structure where the head can be loaded or unloaded against a recording medium.

2. Description of the Related Art

In a magnetic disk apparatus having a ramp mechanism, a magnetic head is loaded on a magnetic disk from a parking position of the ramp mechanism via a ramp. The magnetic head on the magnetic disk is unloaded to the parking position via the ramp of the ramp mechanism. The magnetic head situated on the parking position is latched to the parking position by a latch mechanism formed by a magnet or the like so that the magnetic head is prevented from moving on the ramp or the magnetic disk carelessly.

Therefore, at the time of unloading, it is necessary to control the head moving mechanism so that the magnetic head is driven from the parking position by an unlatch force sufficient for unlatching.

In a conventional magnetic disk apparatus, an operation for unlatching the magnetic head at the time of loading is done by a closed-loop control so that a constant driving electrical current is applied to the head moving mechanism. While there is variation in the latch force for every magnetic disk apparatus due to bad parts, bad installation of the ramp, or the like, the magnetic head can be securely unlatched by applying a driving electrical current, sufficient for unlatching the magnetic head, to the head moving mechanism.

A method for detecting a moving speed of a magnetic head from a VCM (Voice Coil Motor) back electromotive voltage and a method for switching the moving speed of the magnetic head depending on a position of the magnetic head on the ramp mechanism are disclosed in U.S. Pat. No. 6,754,027. Furthermore, a method for reducing the influence on a head speed signal detected from the VCM back electromotive voltage of mutual interference noise from peripheral circuit sections is disclosed in U.S. Pat. No. 6,754,027. In addition, a magnetic disk device capable of stably controlling magnetic head speed even when frictional force changes suddenly at the time of getting on and off a ramp due to variation in coil resistance of a VCM in loading/unloading operations of the magnetic head is disclosed in U.S. Pat. No. 6,496,319. Furthermore, a method for reading a load profile from a ROM so as to update it for a load profile peculiar to a magnetic disk apparatus is disclosed in U.S. Pat. No. 6,212,027.

However, if an excessive driving electrical current, which applies an unlatch force larger than necessary as compared to the latch force applied by the latch mechanism to the magnetic head, is applied to the head moving mechanism of the magnetic head, the ramp may be worn down due to drastic movement of the magnetic head so that fine particles may be generated, the magnetic head may be damaged due to an insufficient floating amount of the magnetic head above the ramp, or a large mechanical noise may be generated when the magnetic head is moved.

In addition, in the conventional magnetic disk apparatus, the latch force of the latch mechanism configured to latch the magnetic head is not measured. Therefore, even if a magnetic disk apparatus has a latch mechanism whose actual latch force is smaller than a designed value due to bad parts or bad installation, the magnetic disk apparatus may be shipped.

Because of this, in the magnetic disk apparatus whose latch force is smaller than the designed value, when an impact is received from the outside, the magnetic head may be unlatched on the ramp or the magnetic head may move onto the magnetic disk. This may cause the magnetic head to become adhered on the magnetic disk in a case where the magnetic disk is not being rotated.

In addition, in a magnetic disk apparatus whose latch force is smaller than the designed value, if a driving electrical current is applied whose value is sufficient for unlatching a magnetic head in a case where the latch force has the designated value, as discussed above, excessive driving electrical current may be applied to the head moving mechanism.

In other words, in the conventional art, a driving electrical current proper for unlatching the magnetic head cannot be applied to the head moving mechanism for every magnetic driving apparatus. Furthermore, it is not possible to identify storage devices having a latch mechanism whose latch force is smaller than a designed value at the time when the storage devices are shipped.

SUMMARY OF THE INVENTION

Accordingly, it is a general object of the present invention to provide a novel and useful storage device.

Another and more specific object of the present invention is to provide a storage device whereby a driving electrical current proper for unlatching a head can be applied to a head moving mechanism by measuring an unlatch force necessary for unlatching the head and whereby a storage device having a latch mechanism whose latch force is smaller than a designed value at the time when the storage device is shipped can be identified.

The above object of the present invention is achieved by a storage device configured to load and unload a head against a storage medium, including:

- a latch mechanism configured to latch the unloaded head;
- a head moving mechanism configured to move the head;
- a measuring part configured to measure an unlatch force necessary for unlatching the head latched by the latch mechanism, by applying a constant electrical current to the head mechanism so that the head is moved in a load direction, by measuring a back electromotive voltage, and calculating a moving speed and acceleration of the head;
- a storing part configured to store information indicating the measured unlatch force in the storage device; and
- a control part configured to apply a driving electrical current corresponding to the stored information to the head moving mechanism where the head is latched by the latch mechanism at the time of loading.

According to the above-mentioned invention, it is possible to provide a storage device whereby a driving electrical current proper for unlatching a head can be applied to a head moving mechanism by measuring an unlatch force necessary for unlatching the head and whereby a storage device having a latch mechanism whose latch force is smaller than a designed value at the time when the storage device is shipped can be identified.

Other objects, features, and advantages of the present invention will be come more apparent from the following detailed description when read in conjunction with the accompanying drawings.

DETAILED DESCRIPTION OF THE PREFERRED EMBODIMENTS

A description is given below, with reference to the FIG. 1 through FIG. 17 of embodiments of the present invention.

In the present invention, an unlatch force necessary for unlatching a head is measured for every storage device such as a magnetic disk apparatus and stored in a system area on a recording medium such as a magnetic disk. A driving current proper for unlatching the head can be applied to a head moving mechanism based on the measured unlatch force at the time of loading the head onto the recording medium so that unnecessary abrasion of a ramp can be prevented.

In addition, it is possible to identify a storage device having a latch mechanism whose latch force is smaller than a designed value at the time when the storage device is shipped whereby the shipment of such a storage device can be prevented. Because of this, it is possible to avoid the problem of having a bad latch force of the latch mechanism.

EXAMPLE

Figure 1:
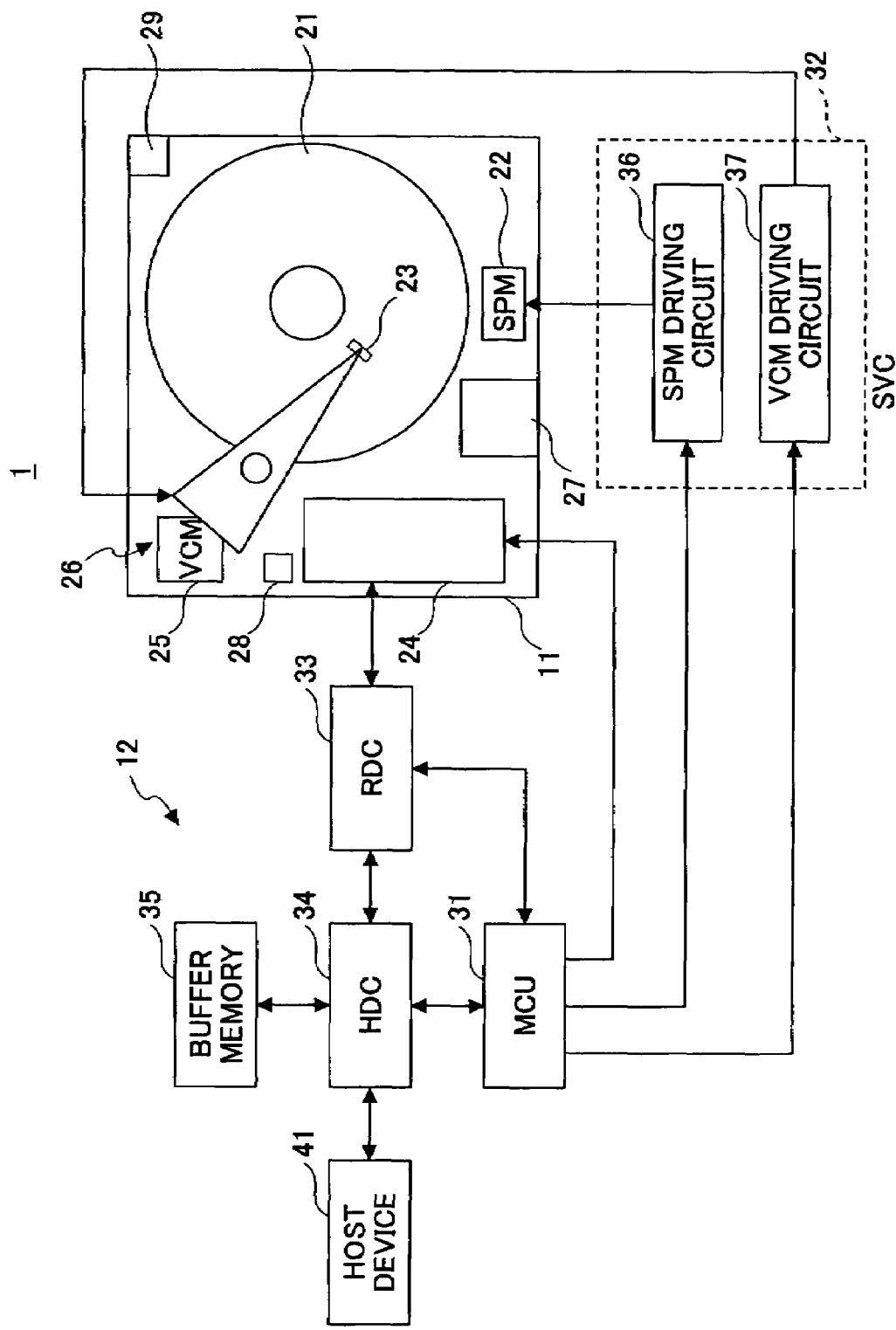
FIG. 1 is a block diagram showing a main part of a storage device of an example of the present invention.

FIG. 1 is a block diagram showing a main part of a storage device of an example of the present invention. In this example, the present invention is applied to a magnetic disk apparatus.

Referring to FIG. 1, a magnetic disk apparatus 1 includes a disk enclosure (hereinafter "DE") 11 and a printed circuit board (hereinafter "PCB") 12.

The DE 11 includes a single or plural magnetic disk(s) 21, a spindle motor (hereinafter "SPM") 22, a single or plural magnetic head(s) 23, a head amplifier 24, a head moving mechanism 26 including a voice coil motor (hereinafter "VCM") 25, a ramp mechanism 27, a latch mechanism 28, a temperature sensor 29, and the like.

The SPM 22 rotates the magnetic disk 21. The magnetic head 23 is provided so as to correspond to the magnetic disk 21. The VCM 25 moves the magnetic head 23. The latch mechanism 28 latches the magnetic head 23 to a parking position of the ramp mechanism 27 by a magnet or the like. Temperature inside of the DE 11 is detected by the temperature sensor 29.

The DE 11 is blocked from the outside via a filter (not shown in FIG. 1) so that the magnetic disk 21 or the magnetic head 23 are protected against dust.

The head moving mechanism 26, the ram mechanism 27, the latch mechanism 28, the temperature sensor 29 and others are illustrated in FIG. 19 for indicating their functions. Their positional relationships are not limited to the structure shown in FIG. 1.

The PCB 12 includes a micro computer unit (hereinafter "MCU") 31, a servo controller (hereinafter "SVC") 32, a read channel 33 (hereinafter "RDC") 33, a hard disk controller (hereinafter "HDC") 34, a data buffer memory 35 functioning as a storage part or storing means, and others.

The SVC 32 includes an SPM driving circuit 36, a VCM driving circuit 37, and others.

The data buffer memory 35 is formed by a RAM or the like. A storage part or storage means includes a memory (not shown) formed by a ROM where firmware or the like is stored.

The PCB 12 is connected to the host device 41 so that data and command can be transferred or received. In this embodiment, for the convenience of explanation, the HDC 34 is connected to the host device 41.

A parameter set in the magnetic disk apparatus 1 for every magnetic head 23 is recorded, in advance, in a system area of the magnetic disk 21. The parameter is read from the system area and developed as a parameter table for holding in the data buffer memory 35. The parameter is read from the data buffer memory 35 and used later at the time of writing and reading.

Since the basic structure of a magnetic disk apparatus shown in FIG. 1 is well-known, detailed explanation of the structure is omitted.

The MCU 31 controls the entirety of the magnetic disk apparatus 1 including the head amplifier 24 and the RDC 33. Position information indicating a position on the magnetic disk 21 of the head 23 is supplied from the RDC 33 to the MCU 31 and address information of the data buffer memory 35 is supplied from the HDC 34 to the MCU 31.

Under the control of the MCU 31, the SVC 32 controls the SPM 22 by the SPM driving circuit 36 and controls the VCM 25 by the VCM driving circuit 37.

The RDC 33 includes a read process system and a write process system. In the read process system, a read signal read from the magnetic disk 21 by the magnetic head 23 and obtained by the head amplifier 24 is processed. In the write process system, a write signal is written onto the magnetic disk 21 by the magnetic head 23 via the head amplifier 24.

The HDC 34 controls, based on commands from the host device 41, receiving and transferring read data and write data between the host device 41 and the magnetic disk apparatus 1. The HDC 34 performs a case operation so that the read data and the write data are stored in the buffer memory 35 for a while.

At the time of unloading the magnetic head 23, the MCU 31 controls the VCM 25 via the VCM driving circuit 37 of the SVC 32, so that the magnetic head 23 is unloaded from the magnetic disk 21, escapes to the parking position via the ramp of the ram mechanism 27 and is latched by the latch mechanism 28.

At the time of loading of the magnetic head 23, the MCU 31 controls the VCM 25 via the VCM driving circuit 37 of the SVC 32, so that the magnetic head 23 is unlatched from the parking position and loaded via the ramp of the ramp mechanism 27 on the magnetic disk 21.

At the time of accessing data on the magnetic disk 21, the MCU 31 controls the SPM 22 via the SPM driving circuit 36 of the SVC 32, so that the magnetic disk 21 is rotated, the above-discussed loading operation is done, and a desirable cylinder of the magnetic disk 21 is accessed.

Figure 2:
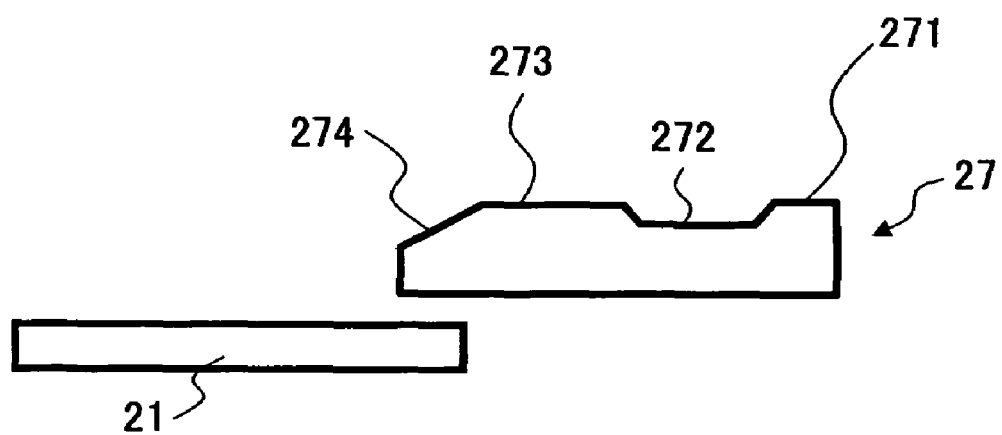
FIG. 2 is a cross-sectional view of a ramp mechanism.
Figure 3:
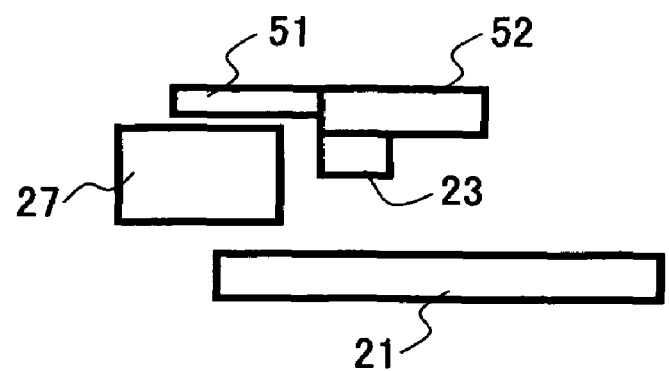
FIG. 3 is a front view of the ramp mechanism.

FIG. 2 is a cross-sectional view of the ramp mechanism 27. FIG. 3 is a front view of the ramp mechanism 27.

As shown in FIG. 2, the ramp mechanism 27 includes a parking part 271 configured to guide the magnetic head 23 at the time of loading and unloading, a concave part 272, a flat part 273, and an inclination part 274. A parking position is situated at the parking part 271 far from the magnetic disk 21.

As shown in FIG. 3, the magnetic head 23 is attached to a lift tab 51 driven by the head moving mechanism 26 via a suspension 52. At the time of loading and unloading, the lift tab 51 moves above the respective parts 271 through 274 of the ramp mechanism 27.

The ramp mechanism 27 is not limited to having a structure such as that shown in FIG. 2 and FIG. 3.

Figure 4:
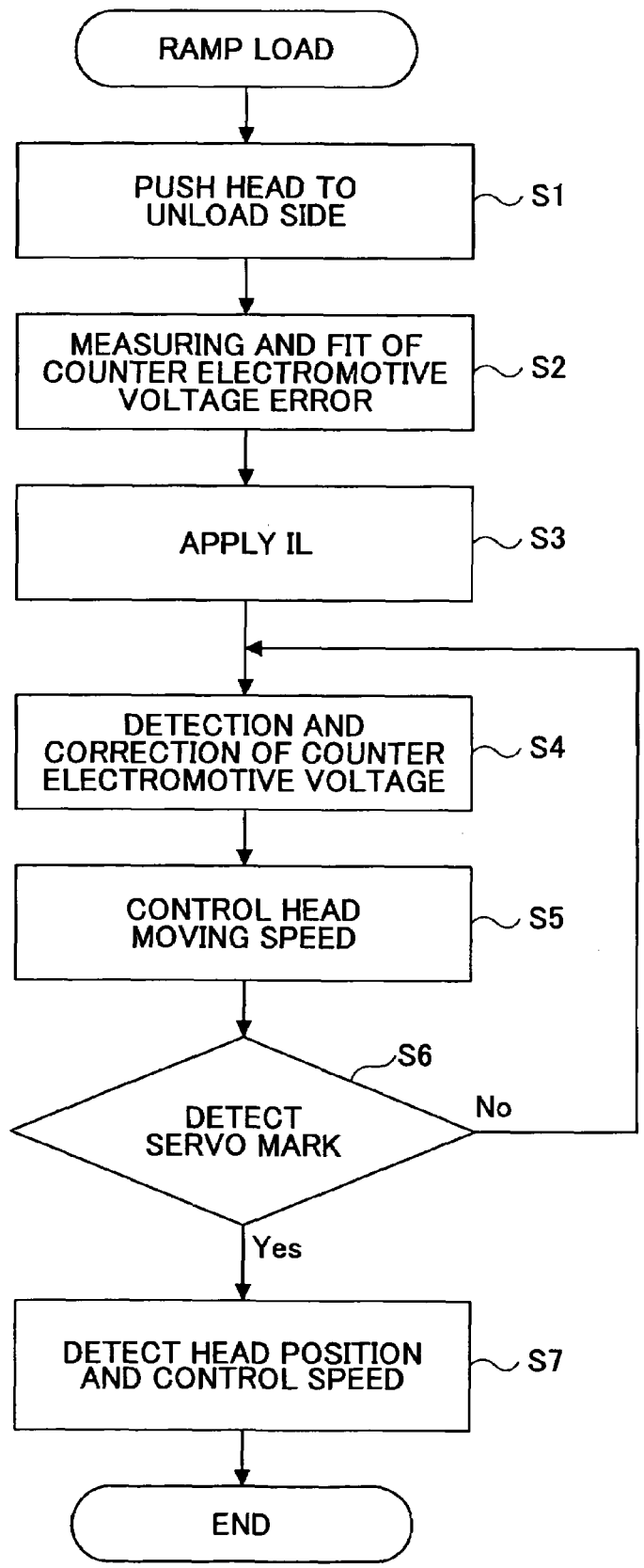
FIG. 4 is a flowchart for explaining a load operation.

FIG. 4 is a flowchart for explaining the load operation. The process shown in FIG. 4 is implemented under the control of the MCU 31.

Referring to FIG. 4, in step 1, based on the receipt of a load command from the host device 41, the magnetic head 23 situated in the parking position is pushed in an unloading direction once so that a driving electrical current for initializing the parking position is applied to the VCM 25.

In step 2, a back electromotive voltage error is measured by linearly fitting a back electromotive voltage against the driving electrical current at two points, namely a driving electrical current of 0 mA and −100 mA whereby the magnetic head 23 is pushed in the unloading direction, for example, so that a tilt and an intercept for a counter electrical current correction is calculated.

In step 3, a driving electrical current (unlatch electrical current) IL sufficient for unlatching and moving the magnetic head 23 latched by the latch mechanism 28 in the load direction is read out from the system area on the magnetic disk 21 or the buffer memory 35 so as to be applied to the VCM 25. While the unlatch electrical current is set to have a constant value against the magnetic disk apparatus in the conventional art, the unlatch electrical current is set to have a proper value for every magnetic disk apparatus and/or atmospheric temperature in this embodiment as discussed below.

Since the magnetic head 23 starts moving in the load direction by applying the unlatch electrical current IL to the VCM 25, in step 4, the back electromotive voltage is detected and the back electromotive voltage is corrected by using the back electromotive voltage error calculated in step 2 and the moving speed of the magnetic head 23 is calculated from the corrected back electromotive voltage.

In step 5, the driving electrical current applied to the VCM 25 is controlled so that the moving speed of the magnetic head 23 is kept at a calculated moving speed.

In step 6, whether a servo mark on the magnetic disk 21 is detected is determined. If the result of the determination is "NO", the process goes back to step 4. If the magnetic head 23 is loaded from the ramp mechanism 27 to the magnetic disk 21 so that the servo mark is detected, the result of the determination of step 6 becomes "YES".

In step 7, the position of the magnetic head 23 on the magnetic disk 21 is detected from the servo frame information by a well-known method so as to be controlled and therefore the load operation is finished.

A method for calculating the head moving speed from the back electromotive voltage of the VCM 25 is well-known and discussed in the above-mentioned U.S. Pat. No. 6,754,027.

Figure 5:
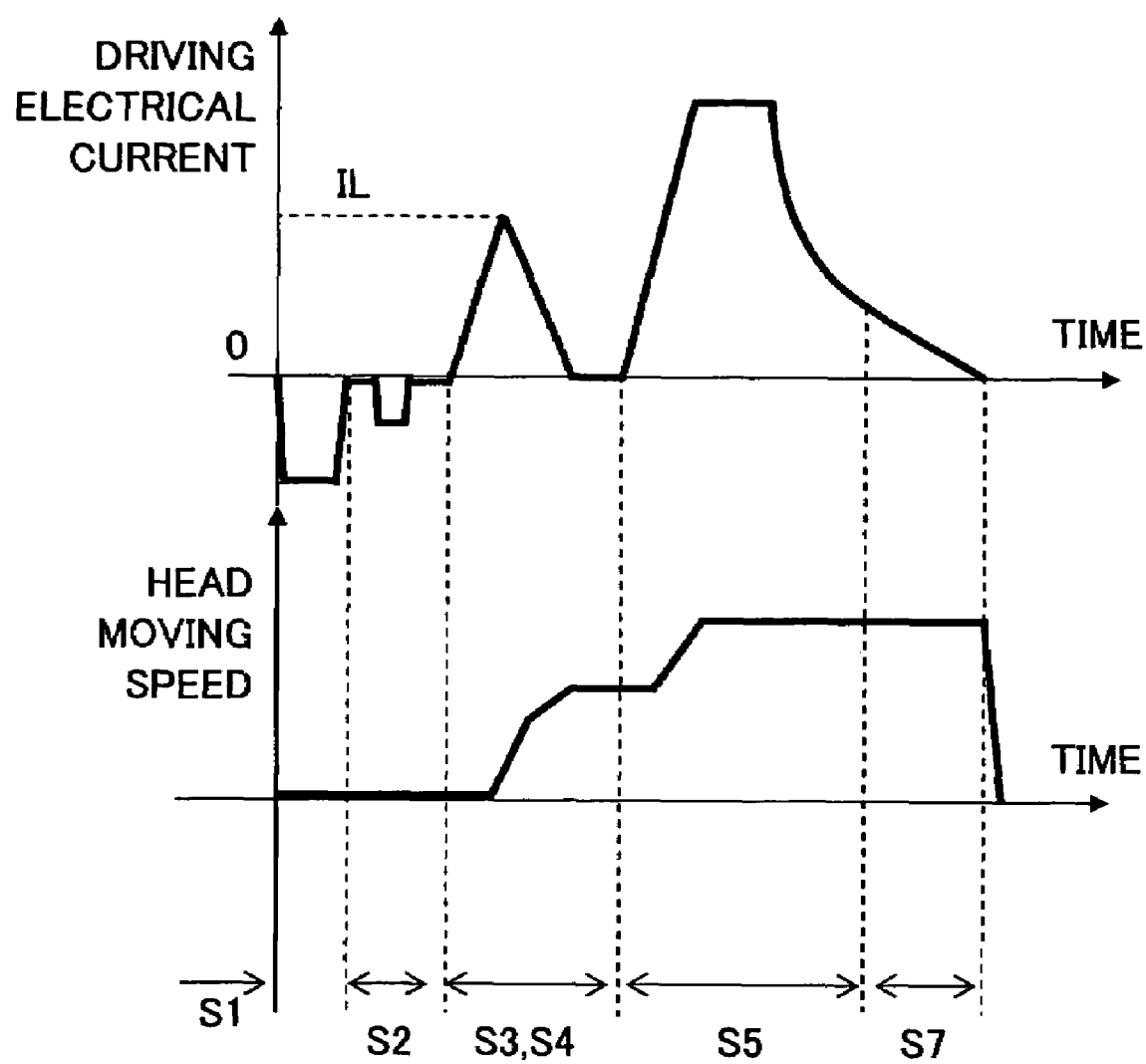
FIG. 5 is a graph showing the magnetic head moving speed and a driving electrical current applied to a VCM at the time of loading.

FIG. 5 is a graph showing the magnetic head 23 moving speed and a driving electrical current applied to the VCM 25 at the time of loading. In FIG. 5, the driving electrical current and the head moving speed and time are indicated by optional units. Furthermore, in FIG. 5, parts that correspond to step 1 through step 5 and step 7 shown in FIG. 4 are given the same reference numerals.

Figure 6:
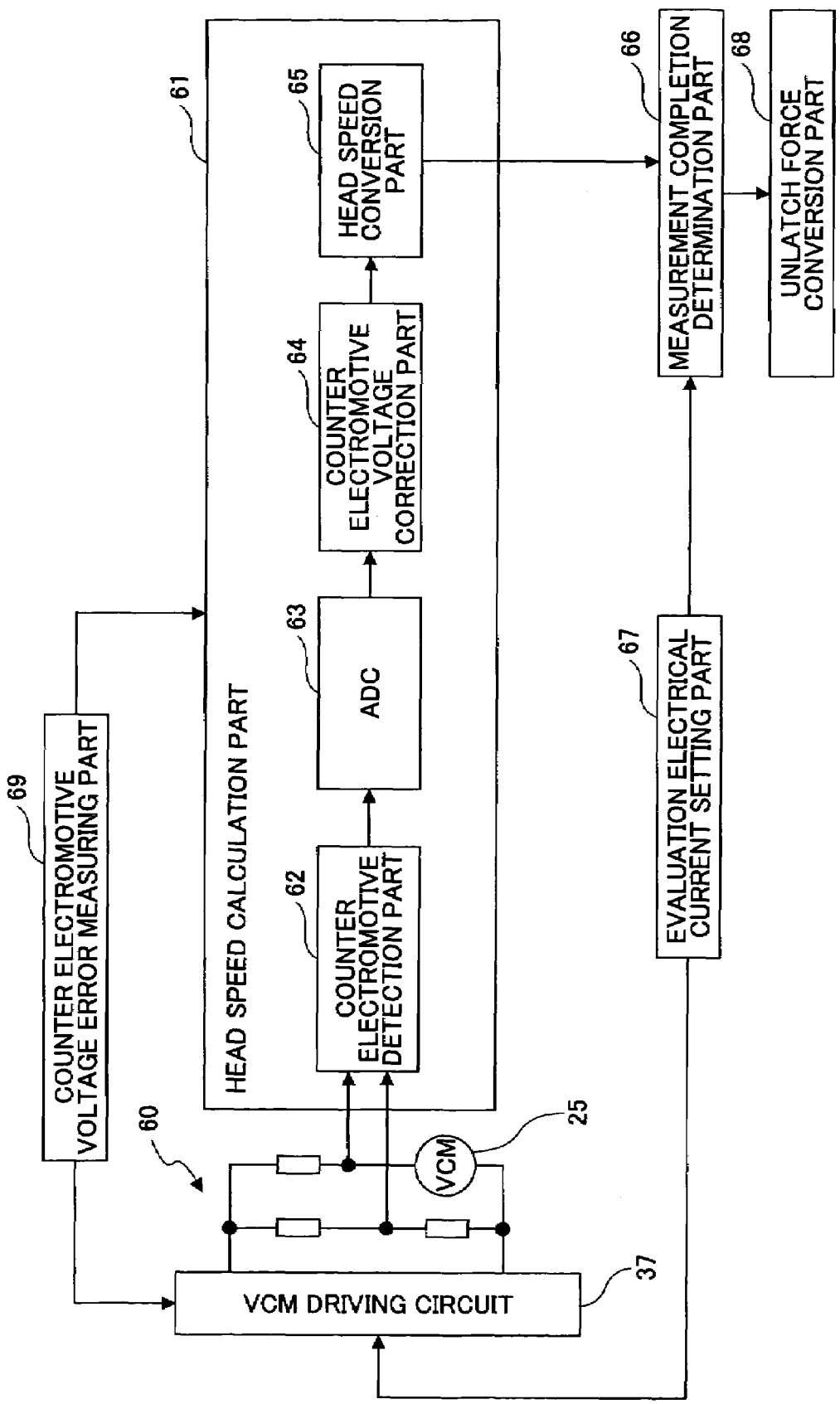
FIG. 6 is a block diagram showing a functional structure of an unlatch force measuring part.

FIG. 6 is a block diagram showing a functional structure of an unlatch force measuring part.

As shown in FIG. 6, a head speed calculation part 61 includes a counter electromotive detection part 62, an analog/digital converter (hereinafter "ADC") 63, a back electromotive voltage correction part 64, and a head speed conversion part 65.

An output of a bridge circuit 60 is input to the counter electromotive detection part 62 of the head speed calculation part 61. An output of the head speed conversion part 65 is input to the VCM driving circuit 37 of the SVC 32 via a measurement completion determination part 66 and an evaluation electrical current setting part 67. An output of measurement completion determination part 66 is input to an unlatch force conversion part 68. A back electromotive voltage error measuring part 69 measures and inputs the back electromotive voltage error to the head speed calculation part 61.

The VCM 25 is connected to the VCM driving circuit 37. The counter electromotive detection part 62 detects the back electromotive voltage by amplifying an output electrical potential difference of the bridge circuit 60.

An offset may be generated as corresponding to the electrical current applied to the VCM 25. Hence, at the time of measuring the back electromotive voltage error, in the back electromotive voltage error measuring part 69, a back electromotive voltage error is measured by linearly fitting a back electromotive voltage against the driving electrical current at two points, namely a driving electrical current of 0 mA and −100 mA whereby the magnetic head 23 is pushed in the unloading direction, for example, so that a tilt and an intercept for a counter electrical current correction is calculated.

The detected back electromotive voltage is analog-digital (AD) converted at a sampling interval of 0.2 ms, for example, by the ADC 63. The back electromotive voltage is corrected by the back electromotive voltage correction part 64 based on the back electromotive voltage error from the back electromotive voltage error measuring part 69. The head speed conversion part 65 converts the corrected back electromotive voltage to the head moving speed.

When the head moving speed or the acceleration is calculated by the head speed conversion part 65 and it is found that the magnetic head 23 starts moving from the head moving speed or the acceleration, the measurement completion determination part 66 determines the completion of the head moving speed or the acceleration. Until the completion of measuring of the head moving speed is determined, the evaluation electrical current setting part 67 sets the driving electrical current for evaluating the unlatch force to be a value increased by a contact value and then inputs it to the VCM driving circuit 37.

The unlatch force conversion part 68 converts a head moving speed calculated by the head speed conversion part 65 when the completion of the measurement of the moving speed of the head is determined and the driving electrical current for evaluating the unlatch force is input to the VCM driving circuit 37, to an unlatch force required for unlatching the magnetic head 23 latched by the latch mechanism 28.

The unlatch force may be calculated by multiplying the driving electrical current (unlatch electrical current) for evaluating the unlatch force in this case by the value of B×L[N/A]. Here, B represents a magnetic flux density, and L represents a coil length crossing the magnetic flux of the VCM 25. Information indicating the unlatch force is written in the system area of the magnetic disk 21 so as to be stored.

Functions of the back electromotive voltage correction part 64, the head speed conversion part 65, the measurement completion determination part 66, the calculation electrical current setting part 67, the unlatch force conversion part 68, and the back electromotive voltage error measuring part 69 are realized by the MCU 31. The bridge circuit 60, the counter electromotive detection part 62, and the ADC 63 may be provided in the head amplifier 24. The counter electromotive detection part 62 and the ADC 63 may be provided in the RDC 33.

Figure 7:
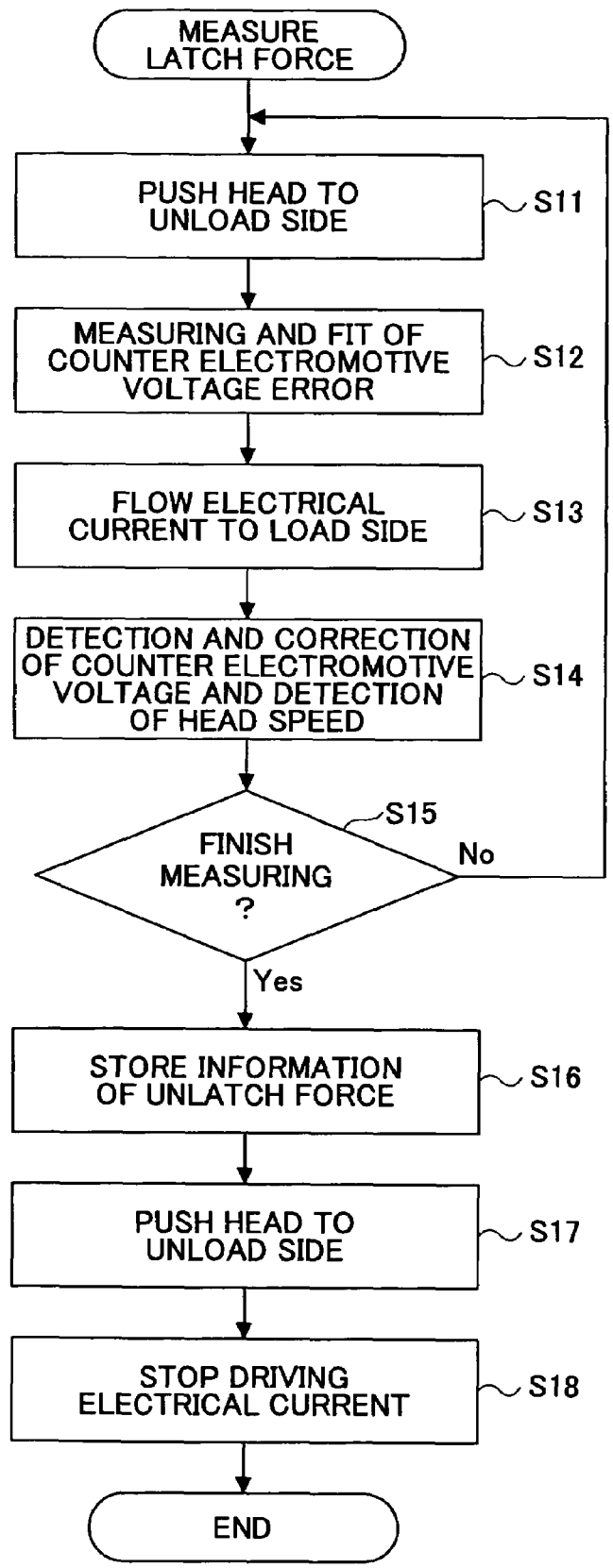
FIG. 7 is a flowchart for explaining an unlatch force measuring operation.

FIG. 7 is a flowchart for explaining an unlatch force measuring operation. The process shown in FIG. 7 is implemented under the control of the MCU 31 having functions shown in FIG. 6.

Referring to FIG. 7, in step 11, based on the receipt of an unlatch force measuring command from the host device 41, the driving electrical current is applied to the VCM 25 for 10 ms, for example, so that the magnetic head 23 situated in the parking position is pushed in an unloading direction once and the parking position is initialized.

In step 12, a back electromotive voltage error is measured by linearly fitting a back electromotive voltage against the driving electrical current at two points, namely a driving electrical current of 0 mA and −100 mA whereby the magnetic head 23 is pushed in the unloading direction, for example, so that a tilt and an intercept for a counter electrical current correction is calculated.

In step 13, a driving electrical current I1=I1+(N−1)X for unlatch force evaluation whereby the magnetic head 23 is moved in the load direction is applied to the VCM 25 for a constant time.

Here, IL represents an initial value of the driving electrical current for evaluating the unlatch force. N represents the number of implementation loops of step 11 through step 15 shown in FIG. 7. X represents a constant value added to the driving electrical current for evaluating the unlatch force for every implementation of the loop. X equals to, for example, 10 mA.

In step 14, the back electromotive voltage is detected and the back electromotive voltage is corrected by using the back electromotive voltage error calculated in step 12, and the moving speed of the magnetic head 23, namely head moving speed, is calculated from the corrected back electromotive voltage.

In step 15, the completion of measuring the head moving speed is determined. More specifically, in step 15, the acceleration is calculated from the calculated head moving speed and the completion of measuring the head moving speed is determined if the acceleration exceeds a threshold value. The threshold value of the acceleration is, for example, 20 mm/s².

If the result of the determination of step 15 is "NO", the process goes back to step 11.

If the result of the determination of step 15 is "YES", information indicating the unlatch force is written and stored in the system area of the magnetic disk 21 in step 16.

Since the magnetic head 23 is situated in an optional position of the ramp mechanism 25 in this state, a constant driving electrical current is applied to the VCM 25 for a constant time so that the magnetic head 23 is moved in the unload direction and pushed to the parking position in step 17.

In step 18, the driving electrical current applied to the VCM 25 is stopped so that the operation for measuring the unlatch force is finished.

In the unlatch force measuring operation shown in FIG. 7, in order to make unevenness of the back electromotive voltage small, the back electromotive voltage error is measured every time when the driving electrical current for evaluating the unlatch force is changed. In addition, in order to make unevenness of the back electromotive voltage small, a back electromotive voltage error is measured by linearly fitting a back electromotive voltage against the driving electrical current at two points, namely a driving electrical current of 0 mA and −100 mA whereby the magnetic head 23 is pushed in the unloading direction, for example.

The information indicating the unlatch force may be information indicating the unlatch force per se or information indicating the driving electrical current (unlatch electrical current IL) applied to the VCM 25 so that the unlatch force is generated. Furthermore, the information indicating may be stored in the buffer memory 35.

The unlatch force measuring operation may be implemented at the time of test prior to shipping of the magnetic disk apparatus 1. Because of this, in a case where it is determined that the measured unlatch force is small and the latch force against the magnetic head 23 by the latch mechanism 28 is relatively smaller than a designated value such as a specification value, the magnetic disk apparatus is a bad apparatus and therefore is not shipped, so that a problem generated due to a bad latch force of the latch mechanism when an impact is added from the outside to the magnetic disk apparatus 1 can be prevented in advance. Furthermore, in a case where the magnetic disk apparatus 1 is determined as a bad apparatus prior to the shipping of the magnetic disk apparatus 1, it is possible to improve the yield rate of the magnetic disk apparatuses 1 by necessary adjustment or parts exchange.

Figure 8:
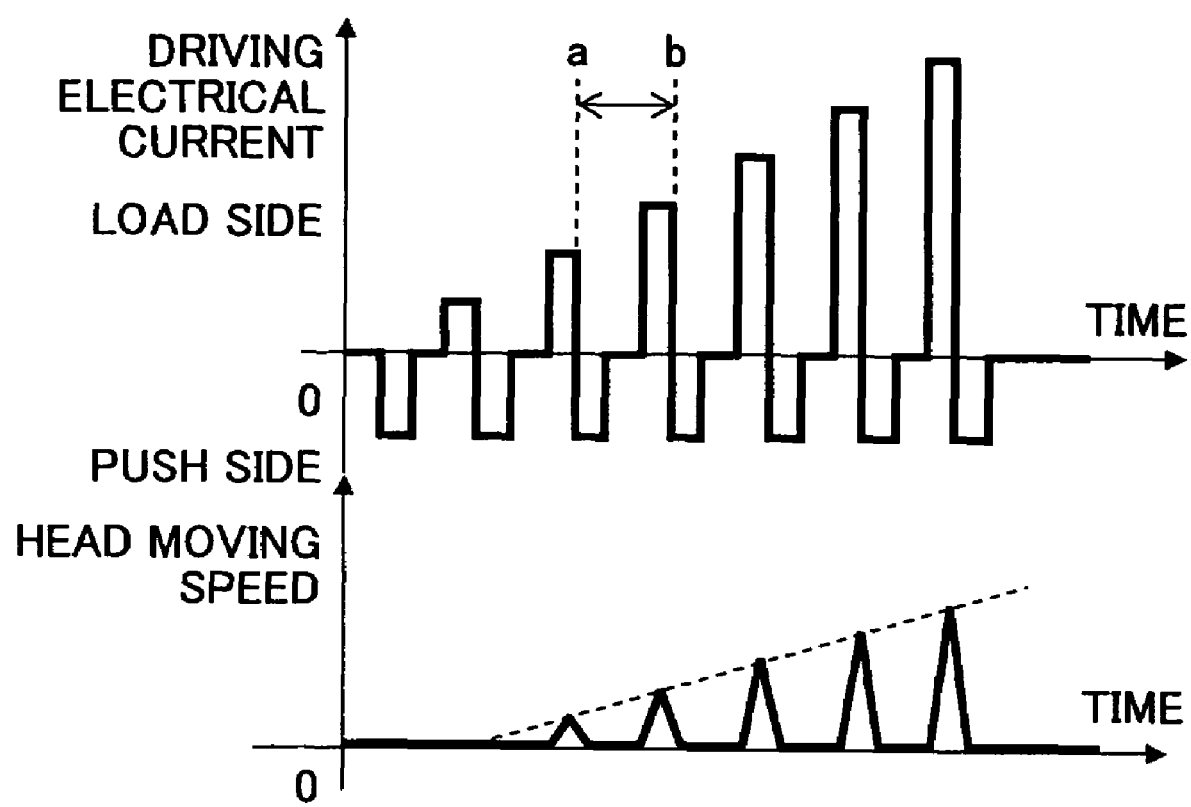
FIG. 8 is a graph showing a relationship between a moving speed of the magnetic head and the driving electrical current applied to the VCM at the time of measurement of the unlatch force.

FIG. 8 is a graph showing a relationship between a moving speed of the magnetic head 23 and the driving electrical current applied to the VCM 25 at the time of measurement of the unlatch force.

In FIG. 8, the electrical current and the head moving speed and time are indicated by optional units. In FIG. 8, when the driving electrical current is small, the head moving speed is zero because the magnetic head 23 is latched by the latch mechanism 28. However, if the driving electrical current exceeds a certain electrical current value, the magnetic head 23 starts moving.

For example, the head moving speed of the magnetic head 23 if the unlatch electrical current IL is 100 mA, 200 mA, or 300 mA is 260 mm/s, 130 mm/s or 87 mm/s.

Figure 9:
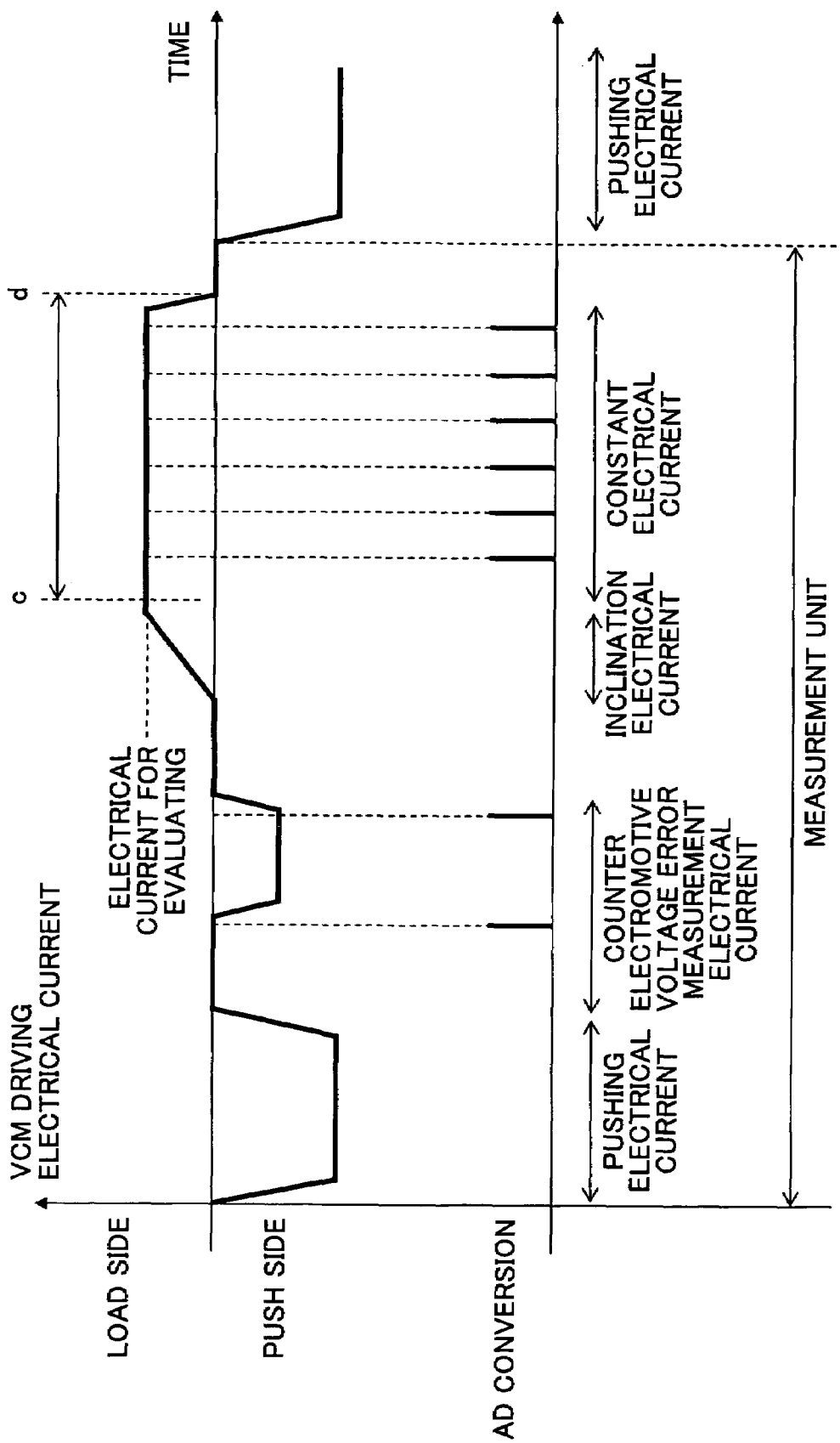
FIG. 9 is an enlarged view of a measuring unit between a and b shown in FIG. 8.

FIG. 9 is an enlarged view of a measuring unit between a and b shown in FIG. 8. As measuring units, a driving electrical current when the magnetic head 23 in the parking position is pushed in the unload direction (pushing electrical current), a driving electrical current when the back electromotive voltage error is measured (back electromotive voltage error measuring electrical current) and a driving electrical current for evaluating the unlatch force (electrical current for evaluating) are shown.

The driving electrical current for evaluating the unlatch force includes an inclination electrical current and a constant electrical current. Since the back electromotive voltage transiently responds after the driving electrical current to the VCM 25 is changed, a correct head moving speed cannot be obtained even if the AD conversion is made right away. Accordingly, in this embodiment, the AD conversion is started after the driving electrical current to the VCM 25 becomes constant, a certain period of time such as 0.2 ms passes, and the transient response of the back electromotive voltage is made. The sampling interval may be set to be 0.2 ms, for example. In the samples, the AD conversion is continuously made for a designated times such as five times and its average value is set to be a sample value.

Figure 10:
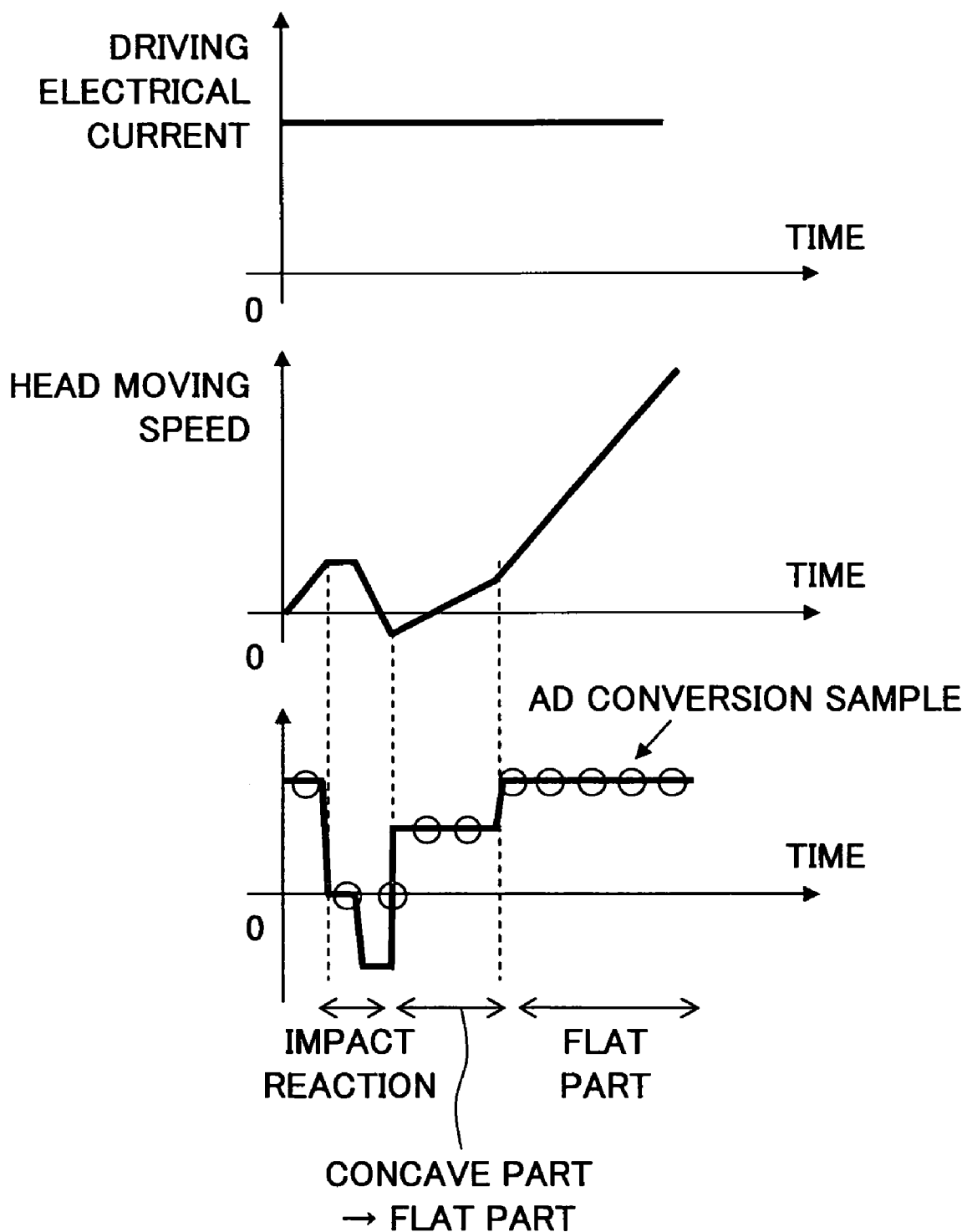
FIG. 10 is an enlarged view of a section between c and d shown in FIG. 9.

FIG. 10 is an enlarged view of a section between c and d shown in FIG. 9. FIG. 10 shows a relationship of the driving electrical current applied to the VCM 25, the head moving speed and the acceleration of the magnetic head 23. A flat part such as a flat part 23 and the parking part 271, the concave part 272 and the inclination part 274 are provided in the ramp mechanism 27 as shown in FIG. 2. Under this structure, the head moving speed and the acceleration make a complex change.

First, based on generation of torque (unlatch force) exceeding the latch force of the latch mechanism 28 against the magnetic head 23, the magnetic head 23 situated in the parking part 271 accelerates toward the concave part 272 so as to move. If the driving electrical current of the VCM 25 is small, the magnetic head 23 may be pushed back by a step part formed by the concave part 272 and the flat part 273. After that, the magnetic head 23 rides from the concave part 272 on the flat part 273 and moves at a contact acceleration rate. Although it is illustrate that the sampling of the AD conversion starts being made when the magnetic head 23 is in the concave part 272, the sampling may be started when the magnetic head 23 arrives at the flat part 273.

FIG. 10 shows a case where an average value of five samples when the magnetic head 23 is situated at the flat part 273, namely a part other than a non-flat part such as the concave part 272 and the inclination part 274, is used in order to determine the finish of the measurement of the head moving speed by determining whether the acceleration exceeds the threshold value. This is because if the number of the samples is small, the result of the measurement may be uneven.

Figure 11:
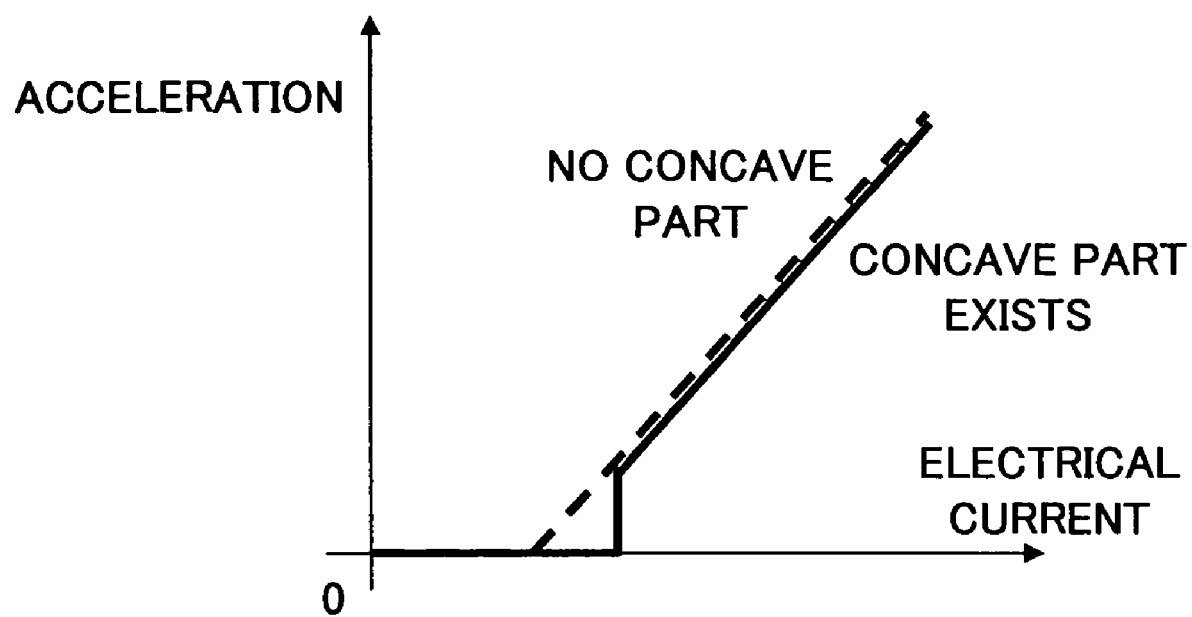
FIG. 11 is a graph showing that changes of acceleration of the magnetic head against the driving electrical current applied to the VCM are different depending on the existence of a concave part of the ramp mechanism.

FIG. 11 is a graph showing that changes of acceleration of the magnetic head 23 against the driving electrical current applied to the VCM 25 are different depending on the existence of a concave part of the ramp mechanism 27.

In FIG. 11, the acceleration of the magnetic head 23 and the driving electrical current applied to the VCM 25 are indicated by optional units. In addition, the acceleration indicates the average value of sampling at the flat part 273 of the ramp mechanism 27.

In a case where the concave part is not provided, as shown by a dotted line in FIG. 11, if the driving electrical current becomes an electrical current whereby a torque exceeding the latch force against the magnetic head 23 works, the acceleration of the magnetic head 23 is continuously increased.

In a case where the concave part is provided, as shown by a solid line in FIG. 11, a torque excessive for getting over the step part formed by the flat part 273 and the concave part 272 is required. Hence, if the driving electrical current exceeds a certain electrical current value, the acceleration of the magnetic head 23 is increased discretely.

Figure 12:
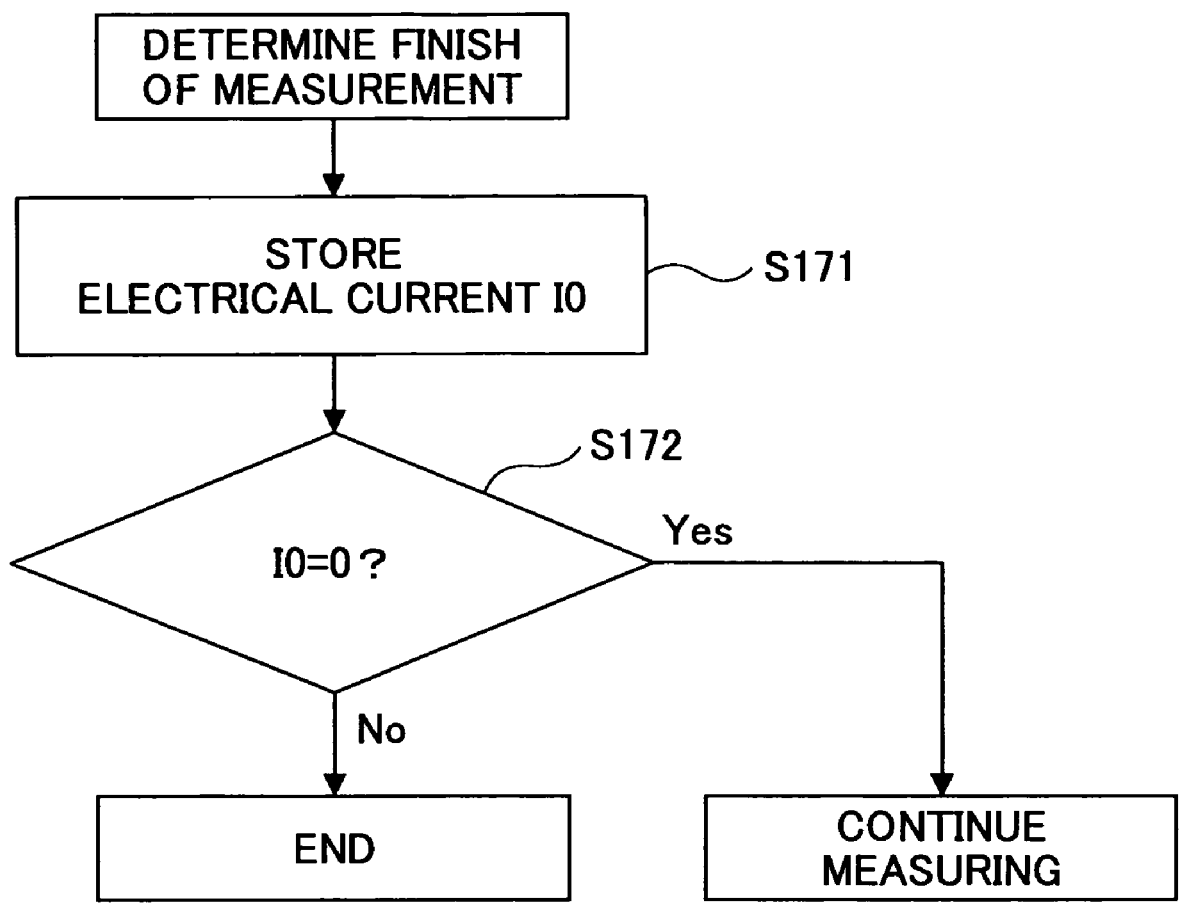
FIG. 12 is a flowchart showing a first example of step 15 shown in FIG. 7 determining finish of the measurement of the moving head speed.

FIG. 12 is a flowchart showing a first example of step 15 shown in FIG. 7 determining the finish of the measurement of the moving head speed.

Referring to FIG. 12, in step 171, a driving electrical current I0 applied to the VCM 25 when the acceleration of the magnetic head 23 exceeds the threshold value a0 is stored.

In step 172, whether the driving electrical current I0 is 0 mA is determined. If the determination result of step 172 is NO, the process is finished and the determination result of step 15 becomes YES. If the determination result of step 172 is YES, the measuring of the head moving speed continues so that the determination result of step 15 becomes NO and the process goes back to step 11 shown in FIG. 7.

Figure 13:
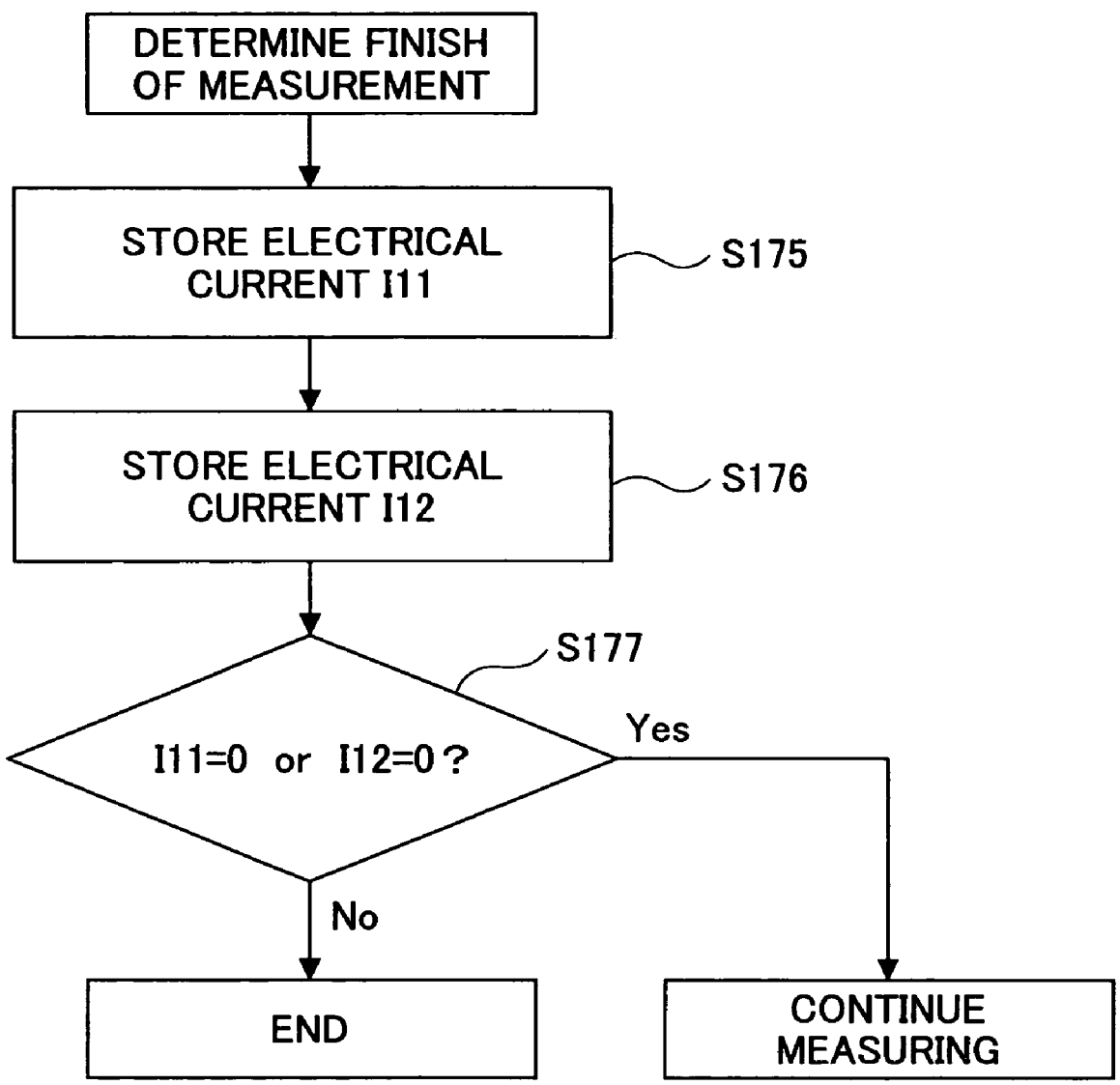
FIG. 13 is a flowchart showing a second example of step 15 shown in FIG. 7 determining finish of the measurement of the moving head speed.

FIG. 13 is a flowchart showing a second example of step 15 shown in FIG. 7 determining the finish of the measurement of the moving head speed.

Referring to FIG. 13, in step 175, a driving electrical current I11 applied to the VCM 25 when the acceleration of the magnetic head 23 exceeds the threshold value a1 is stored.

In step 176, a driving electrical current I12 applied to the VCM 25 when the acceleration of the magnetic head 23 exceeds the threshold value a2 (a2>a1) is stored.

In step 177, whether the driving electrical current I11 is 0 mA or whether the driving electrical current I12 is 0 mA is determined. If the determination result of step 177 is NO, the process is finished and the determination result of step 15 becomes YES. If the determination result of step 177 is YES, the measuring of the head moving speed continues so that the determination result of step 15 becomes NO and the process goes back to step 11 shown in FIG. 7. In this case, a driving electrical current, wherein the driving electrical currents I11 and I12 are linearly fitted so that the acceleration becomes zero, is regarded as the unlatch electrical current IL.

Figure 14:
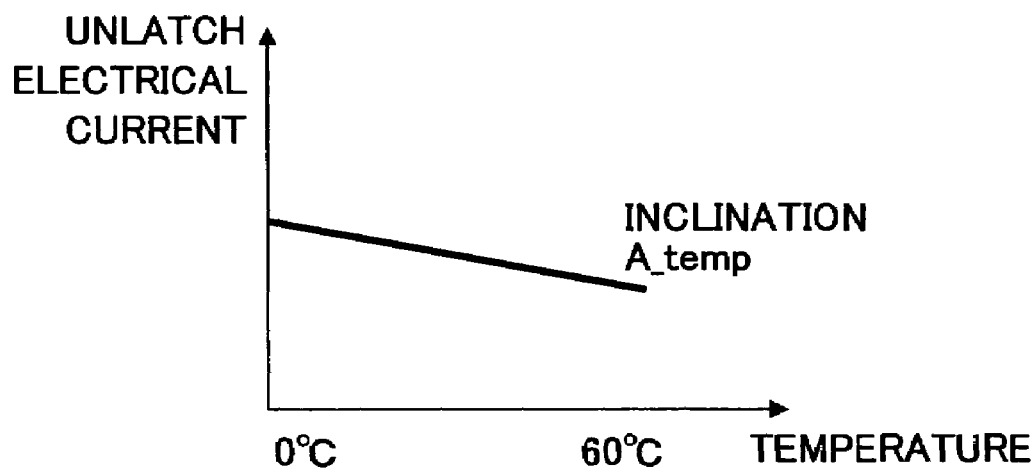
FIG. 14 is a graph showing temperature dependency of the unlatch electrical current.

FIG. 14 is a graph showing a temperature dependency of the unlatch electrical current. In FIG. 14, the unlatch electrical current is indicated by optional units.

As shown in FIG. 14, the unlatch electrical current is changed based on the atmospheric temperatures of the magnetic disk apparatus 1. Because of this, the unlatch electrical currents may be measured at the atmospheric temperature of 25° C. and 60° C., for example, and the linear fitting may be made so that an inclination A_Temp is obtained, and information indicating an unlatch electrical current property against the temperature may be stored in the system area of the magnetic disk 21 or the buffer memory 35 in the magnetic disk apparatus 1. More specifically, the inclination A_Temp and the atmospheric temperature Tu of the magnetic disk apparatus 1 when the unlatch electrical current IL stored in the system area of the magnetic disk 21 and the buffer memory of the magnetic disk apparatus 1 is set, may be stored. One of the unlatch electrical current and the information indicating the unlatch electrical current property against the temperature may be stored in the system area of the magnetic disk 21 and the other of them may be stored in the buffer memory 35 of the magnetic disk 1.

In this case, at the time of loading, the temperature in the magnetic disk apparatus 1 is detected by the temperature sensor 29. Based on the detected temperature, it is possible to correct the unlatch electrical current IL read from the system area of the magnetic disk 21 and the buffer memory 35 of the magnetic disk apparatus 1, by referring to the information indicating the unlatch electrical current property against the temperature (the inclination A_Temp and the atmospheric temperature Tu when the unlatch electrical current IL is set) stored in the system area of the magnetic disk 21 and the buffer memory 35 of the magnetic disk apparatus 1. Because of this, the unlatch electrical current IL can be properly set for every magnetic disk apparatus 1 and atmospheric temperature.

Figure 15:
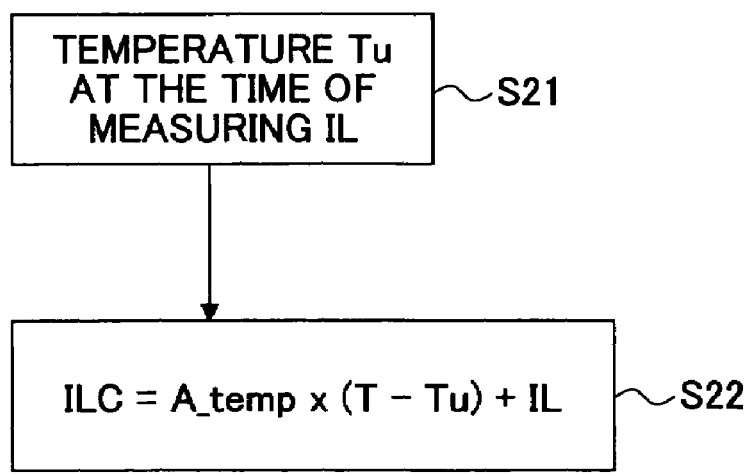
FIG. 15 is a flowchart for explaining correction operations for correcting the unlatch electrical current depending on the temperature.

FIG. 15 is a flowchart for explaining correction operations for correcting the unlatch electrical current IL depending on the temperature. Step 21 and step 22 shown in FIG. 15 are implemented by, for example, step 3 shown in FIG. 4.

In step 21, for example, the unlatch electrical current IL and the atmospheric temperature Tu at the time when the unlatch electrical current IL is set are read out from the system area of the magnetic disk 21 to the magnetic disk apparatus 1.

In step 22, for example, an inclination A_Temp is read out from the system area of the magnetic disk 21. The unlatch electrical current IL is corrected by using the atmospheric temperature T in the magnetic disk apparatus 1 detected by the temperature sensor 29. The unlatch electrical current IL is corrected based on the equation of, for example, correction unlatch electrical current $ILC = A\_Temp \times (T-Tu) + IL$.

The unlatch electrical current property against the temperature (or profile) may be stored in the system area of the magnetic disk 21 or buffer memory 35 of the magnetic disk apparatus 1, in the format of a look-up table. In this case, as corresponding to a gap of the atmospheric temperature at the time when the look-up table is formed, the unlatch electrical current wherein the temperature is corrected can be read out by referring to the look-up table wherein the temperature detected by the temperature sensor 29 at the time of loading is interpolated.

Figure 16:
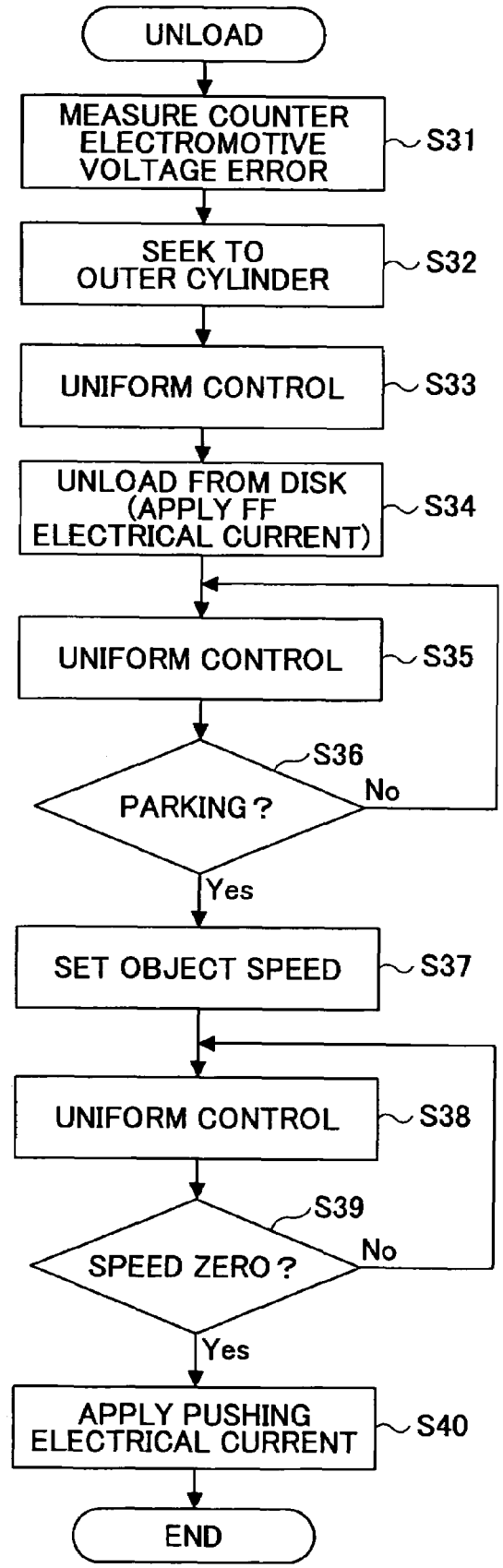
FIG. 16 is a flowchart for explaining the unload operation.

FIG. 16 is a flowchart for explaining the unload operation. The process shown in FIG. 16 is implemented under the control of the MCU 31.

Referring to FIG. 16, in step 31, based on the receipt of an unload command from the host device 41, the back electromotive voltage error is measured in an inner stopper (not shown) arranged in an innermost position on the magnetic disk 21 where the magnetic head 23 can be situated.

In step 32, the magnetic head 23 is made to seek an outer cylinder on the magnetic head 23.

In step 33, the back electromotive voltage is detected and a uniform control whereby the driving electrical current is applied to the VCM 25 is implemented so that the magnetic head 23 moves at a constant moving speed.

In step 34, the driving electrical current of the VCM 25 is controlled to an FF electrical current so that the magnetic head 23 moves from the magnetic disk 21 to the inclination part 27 of the ramp mechanism 27.

In step 35, the back electromotive voltage is detected and a uniform control whereby the driving electrical current is applied to the VCM 25 is implemented so that the magnetic head 23 moves at a constant moving speed.

In step 36, whether the magnetic head 23 has arrived at the parking part 271 of the ramp mechanism 27 is determined.

If the determination result of step 36 is NO, the process goes back to step 35.

If the determination result of step 36 is YES, in step 37, for example, an object head moving speed is set based on information indicating the unlatch force stored in the system area of the magnetic disk 21 such as the unlatch electrical current IL. The driving electrical current based on the object head moving speed is applied to the VCM 25.

In step 38, a uniform control whereby the driving electrical current is applied to the VCM 25 is implemented so that the magnetic head 23 moves at a constant moving speed.

In step 39, whether the head moving speed is zero is determined.

If the determination result of step 39 is NO, the process goes back to step 38.

If the determination result of step 39 is YES, in step 40, the driving electrical current is applied to the VCM 25 for a constant time so that the magnetic head 23 situated in the parking position is pushed in the unload direction, and thereby the process is finished.

Thus, in step 37, the object head moving speed is set based on the unlatch electrical current IL and the driving electrical current based on the object head moving speed is applied to the VCM 25. Therefore, the ramp mechanism 28 may not be worn due to the drastic movement of the magnetic head 23 and mechanical noise may not be generated. In addition, the object head moving speed set based on the unlatch electrical current IL is stored in the buffer memory 35 of the magnetic disk apparatus 1 or the system area of the magnetic disk 21, so that the magnetic head 23 can be moved at a head moving speed proper for the latch force of the latch mechanism 28 by reading out the stored object head moving speed at the time of unloading.

Figure 17:
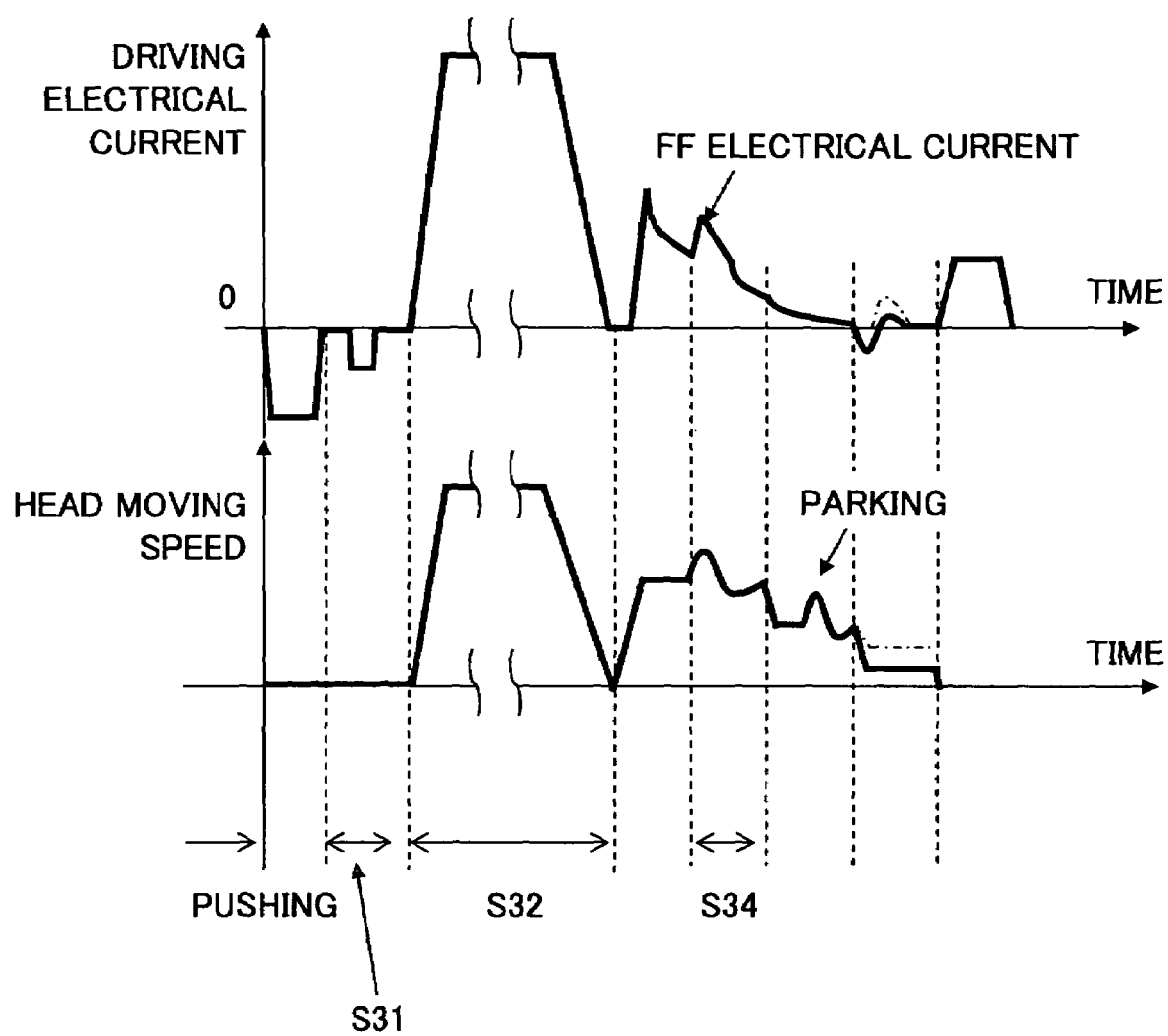
FIG. 17 is a graph showing the moving speed of the magnetic head and the driving electrical current applied to the VCM at the time of unloading.

FIG. 17 is a graph showing the moving speed of the magnetic head 23 and the driving electrical current applied to the VCM 25 at the time of unloading.

In FIG. 17, the driving electrical current and the head moving speed and time are indicated by optional units. Furthermore, in FIG. 17, parts that correspond to step 31, step 32 and step 34 shown in FIG. 16 are given the same reference numerals.

Polarity of the speed and the electrical current in FIG. 17 is illustrated in the same way as FIG. 5 because the moving direction of the magnetic head 23, namely the unload direction is opposite to the moving direction (loading direction) of FIG. 5. However, actual polarity is reversed.

In addition, a dotted line in FIG. 17 shows an electrical current and a head moving speed in a case where the latch force by the latch mechanism 28 is small, that is a case where the unlatch force is small.

According to the above-mentioned embodiment of the present invention, the unlatch force necessary for unlatching the magnetic head is measured so that a driving electrical current proper for unlatching the magnetic head can be applied to a head moving mechanism or the magnetic disk apparatus having a latch mechanism whose latch force is smaller than a design value at the time of shipping of the magnetic disk apparatus can be identified.

If an excessive driving electrical current which applies an unlatch force larger than necessary as compared to the latch force of the magnetic head by the latch mechanism to the magnetic head is applied to the head moving mechanism, the ramp may be worn down due to drastic movement of the magnetic head so that fine particles may be generated, the magnetic head may be damaged due to insufficient floating amount of the magnetic head by the ramp, or a large mechanical noise may be generated when the magnetic head is moved.

However, wearing of the ramp causing the above-mentioned problems can be prevented by applying the driving electrical current proper for unlatching the magnetic head to the head moving mechanism.

In addition, by measuring the unlatch force necessary for unlatching the magnetic head at the time of shipping, it is possible to identify a magnetic disk apparatus having a latch mechanism whose actual latch force is smaller than a design value due to bad parts or bad attachment, and implement necessary adjustment or exchange the parts prior to shipping.

As a result of this, it is possible to avoid shipping a magnetic disk apparatus whose actual latch force is smaller than a design value, so that it is possible to avoid a problem due to an incorrect latch force of the latch mechanism.

The present invention is not limited to these embodiments, but variations and modifications may be made without departing from the scope of the present invention.

For example, the present invention can be applied to not only a magnetic disk apparatus but also other storage device such as an optical disk apparatus or an optical magnetic disk having a similar head latch mechanism.

This patent application is based on Japanese Priority Patent Application No. 2005-275391 filed on Sep. 22, 2005, the entire contents of which are hereby incorporated by reference.

What is claimed is:

1. A storage device configured to load and unload a head against a storage medium, comprising:
    a latch mechanism configured to latch the unloaded head;
    a head moving mechanism configured to move the head;
    a measuring part configured to measure an unlatch force necessary for unlatching the head latched by the latch mechanism, by applying a constant electrical current to the head mechanism so that the head is moved in a load direction, by measuring a back electromotive voltage, and calculating a moving speed and acceleration of the head;
    a storing part configured to store information indicating the measured unlatch force in the storage device; and
    a control part configured to apply a driving electrical current corresponding to the stored information to the head moving mechanism where the head is latched by the latch mechanism at the time of loading.

2. The storage device as claimed in claim 1, wherein the measuring part measures the unlatch force by using an electrical current value applied to the head moving mechanism when acceleration exceeds a threshold value.

3. The storage device as claimed in claim 1, wherein the measuring part measures the unlatch force by using an electrical current value wherein an electrical current applied to the head moving mechanism when acceleration exceeds two different threshold values is linearly fitted so that the acceleration becomes zero.

4. The storage device as claimed in claim 1, further comprising:
    a detection part configured to detect temperature in the storage device;
    wherein the storage part stores an unlatch electrical current indicating the unlatch force measured by the measuring part at least two different temperatures, together with the temperature, as information indicating an unlatch electrical current property against temperature, and
    the control part applies the unlatch electrical current corresponding to the temperature detected by the detection part, as the driving electrical current, based on the information indicating the unlatch electrical current property against temperature, where the head is latched by the latch mechanism at the time of loading.

5. The storage device as claimed in claim 4, wherein the information indicating the unlatch electrical current property against temperature is stored in the storing part of the storage device or in an area of the storage medium.

6. The storage device as claimed in claim 1, further comprising:
    a ramp mechanism formed by a non-flat part and a flat part configured to guide the head at the time of loading and unloading;
    wherein the measuring part calculates the moving speed when the head is guided by the flat part.

7. The storage device as claimed in claim 1, wherein the measuring part sets the driving electrical current for evaluating the unlatch force to a value increased by a certain value, applies the set driving electrical current to the head moving mechanism, and converts the moving speed when the acceleration exceeds a threshold value to the unlatch force.

8. The storage device as claimed in claim 7, wherein the measuring part implements error correction of the back electromotive voltage detected for every time when the driving electrical current for evaluating the unlatch force is increased by a certain value.

9. The storage device as claimed in claim 1, wherein the information indicating the unlatch force is stored in the storing part of the storage device or in an area of the storage medium.

* * * * *

UNITED STATES PATENT AND TRADEMARK OFFICE
CERTIFICATE OF CORRECTION

PATENT NO.       : 7,277,253 B2   Page 1 of 1
APPLICATION NO.  : 11/358455
DATED            : October 2, 2007
INVENTOR(S)      : Yamashita et al.

It is certified that error appears in the above-identified patent and that said Letters Patent is hereby corrected as shown below:

Col. 14, line 15, delete "at least" and insert --at at least--.

Signed and Sealed this

Third Day of June, 2008

JON W. DUDAS
*Director of the United States Patent and Trademark Office*